Nov. 22, 1955  C. E. GOODELL  2,724,816
DELTA DEMODULATED ACOUSTIC DEPTH RECORDER
Filed Dec. 30, 1954  4 Sheets-Sheet 2

INVENTOR
C. E. GOODELL

Nov. 22, 1955   C. E. GOODELL   2,724,816
DELTA DEMODULATED ACOUSTIC DEPTH RECORDER
Filed Dec. 30, 1954   4 Sheets-Sheet 3

INVENTOR
C. E. GOODELL
BY
ATTORNEYS

Nov. 22, 1955     C. E. GOODELL     2,724,816
DELTA DEMODULATED ACOUSTIC DEPTH RECORDER
Filed Dec. 30, 1954     4 Sheets-Sheet 4

INVENTOR
C. E. GOODELL

United States Patent Office 2,724,816
Patented Nov. 22, 1955

2,724,816

DELTA DEMODULATED ACOUSTIC DEPTH RECORDER

Charles E. Goodell, Hyattsville, Md., assignor to the United States of America as represented by the Secretary of the Navy Application December 30, 1954, Serial No. 478,947

17 Claims. (Cl. 340—3)

(Granted under Title 35, U. S. Code (1952), sec. 266)

The invention described herein may be manufactured and used by or for the Government of the United States of America for governmental purposes without the payment of any royalties thereon or therefor.

The present invention relates to a delta demodulated acoustic depth recorder for a submarine vehicle and more particularly to an acoustic depth recorder having a delta demodulator to reduce range errors due to echo loss caused by scattering, absorption and secondary reflections of the echoes by applying a compensating time increment corresponding to a given known increment of indicated depth to the range determining component for each true-range echo that is lost.

The behavior and operation of a torpedo, mine, or other moving underwater vehicle cannot be completely described without knowing, among other things, the instantaneous depth of the vehicle throughout its run. The instrument generally used for torpedo depth measurements is the hydrostat, a device similar in operation to the aneroid barometer used to measure the altitude of an object in air. Both the hydrostat and the aneroid barometer are essentially static measuring devices and because of their slow response indicate only the average change of any rapid fluctuation. The radio altimeter, with its instantaneous response, overcame this objection for airborne objects. The fathometer similarly indicates rapid changes in distance to the ocean floor; however, the irregular and unknown variations in floor topography constitute a poor plane of reference for depth measurements. In addition, when torpedoes, or mines, are operated in very deep water, the distance between the torpedo, or mine, and ocean floor would be beyond the range of a suitable fathometer. The only remaining usable reference is the air-water interface.

The use of the air-water boundary is complicated by the fact that the surface irregularities produce an inherently poor reflecting surface. Nevertheless, as a solution to the problem of rapid and accurate depth determination, the present invention provides an echo ranging instrument utilizing the air-water interface as a reflecting surface.

Air-water boundary, used as a reflector, is neither of regular shape nor unchanging with time. Variability of surface waves, travel of the torpedo, and large-scale temperature stratifications cause variations in pulse transit time. This appears as jitter in the return pulse position and an apparent fluctuation in depth.

Return pulse amplitude fluctuation is also troublesome. This is caused by factors having to do with the propagation of sound in water and factors characterizing reflective properties of the air-water interface. The fluctuation in intensity, at a given point, is due to the reinforcement or cancellation of many signals arriving from different reflectors.

The effects of wave troughs upon echoes can be compared to dispersion of light by a convex mirror, while wave peaks act as a concave mirror. The net effect causes loss of echo. Other factors that seriously affect return echo detection are noise properties of vehicle, pitch and roll of vehicle and directivity of the transducer.

The present invention contemplates the provision of an echo-ranging depth recorder which is appreciably unaffected by the aforementioned troublesome factors presented by air-water boundary as a reflector. In accordance with the invention, the echo-ranging depth recorder comprises a transmitter for radiating ultrasonic impulses and a receiver, which is maintained quiescent during impulse transmission by a disabling pulse coincident with the transmitted pulse for receiving the reflected echoes of the transmitted impulses. An Eccles-Jordan multivibrator is interconnected between the transmitter and the output of the receiver and is adaptable to have its first condition of stable operation initially changed to its second condition of stable operation by a peaked pulse from the transmitter which is in time coincidence with the transmitted impulse and to subsequently be returned to its first condition of operation by a peaked pulse derived from the received echo by the receiver, the time duration between initiation of the second condition of stable operation and the instant of return to the first condition of operation being correlative with the time elapsed between transmission of an impulse and the reception of its reflected echo. This time duration is integrated and recorded by a recording device to give an indication representative of the range of the air-water interface reflector from the submarine vehicle.

In order to prevent false echoes, due to scattering, from affecting the depth recorder, a thyratron pulse shaper circuit is employed as a lock-out device in the output of the receiver. Because of the irregular character of the air-water surface, there are many points on the surface which reflect signals back to the transducer and no single echo signal exists. There is the main echo, or shortest-path echo, which is the first echo received for each transmitted pulse, followed by a series of irregular echoes of diminishing amplitude. The leading edge of the shortest-path echo fires the thyratron which immediately prevents any false echoes from affecting the recorder for a predetermined period of time, the thyratron developing a trigger spike from the shortest-path echo which is applied to the Eccles-Jordan circuit to return it to its first condition of stable operation.

Operatively associated with the Eccles-Jordan circuit is a demodulator, which shall hereinafter be referred to as a delta demodulator. If an echo signal is lost resulting in failure of the Eccles-Jordan returning to the first stable condition of operation the delta demodulator functions to apply a simulated-echo triggering pulse to the Eccles-Jordan circuit a predetermined increment of time after the lost echo should have been received to thereby return the Eccles-Jordan circuit to its first condition of operation. The predetermined increment of time is determined by the known mass of the submarine vehicle and its known rate of descent and ascent in water and corresponds to a calculated increment of depth which the particular vehicle in question would vary during the predetermined increment of time. If a series of successive echoes are lost, the delta demodulator applies a trigger pulse for each echo lost, the time increment cumulatively increasing an equal amount for each succeeding lost echo, that is, the time increment for the second lost echo in the successive series of lost echoes being twice the time increment of the first lost echo, the time increment for the third lost echo in the successive series of lost echoes being thrice the time increment of the first lost echo, etc. The delta demodulator comprises a pair of one-shot multivibrators connected in cascade across the Eccles-Jordan circuit.

An object of the present invention is the provision of an acoustic depth recorder for underwater vehicles.

Another object is to provide a mobile underwater transceiver for continuously measuring the distance variations to the surface of the water.

Another object is to provide, in a submarine vehicle, an echo-ranging acoustic depth recorder utilizing the air-water interface as the reference surface and reflector.

A further object of the invention is the provision of an echo-ranging acoustic depth recorder for measuring and indicating the instantaneous depth variations of a submarine vehicle.

A still further object is to provide an ultrasonic echo-ranging depth recorder borne by a moving underwater vehicle for continuously measuring the running depth of the vehicle by determining the transit time of ultrasonic pulses reflected from the air-water boundary surface.

A still another object is to provide an echo-ranging system wherein the range indicating means is unaffected by false echoes.

A still further object is the provision of a pulse-echo range measuring system having lock-out circuit means for barring and preventing false echoes from activating the range indicating means.

Another further object of the invention is the provision, in a mobile submarine vehicle, of an ultrasonic echo-ranging depth recorder utilizing the shortest-path echo for measuring the depth of the vehicle.

A still another further object is to provide, in an underwater vehicle a pulse-echo depth recording system having circuit means for passing the shortest-path echo signal to the range deriving component of the system and excluding subsequent false echoes therefrom whereby the indicated range is determined from the shortest-path echo.

A still another object is to provide in a range measuring system a variable-width pulse developing means for developing a pulse having a width correspondinng to the measured distance.

Another further object is the provision of a pulse-echo distance determining system having variable-width pulse developing means initiable at the instants of pulse transmission and echo reception for developing a pulse having a width correlative with the transit time of the reflected pulse.

And another further object is to provide, in a pulse-echo range measuring system, a variable-width pulse developer for developing a pulse having a width representatively corresponding to the time elapsed between the instant of transmission of a transmitted impulse and the reception of its shortest-path reflected echo.

A still another object is the provision of a transmit-receive echo-ranging system including clamping means for disabling the receiver circuit during transmission of ultrasonic impulses, lock-out circuit means for passing the shortest-path reflected echo of the transmitted impulse and excluding subsequent extraneous echoes caused by inhomogeneity of the reflecting surface, and pulse forming means initiable at the instant of impulse transmission and responsive to the signal of the shortest-path echo passed by the lock-out circuit means for developing a pulse having a width correlative to the elapsed time between the instant of impulse transmission and reception of its shortest-path echo.

Another object of the invention is to provide electronic means in a radar ranging system to compensate for range errors caused by loss of echo.

Another further object of the invention is the provision of pulse generatnig means in an echo-ranging system to fill in lost echoes.

A still further object is to compensate for range errors due to echo loss in a radar ranging system by developing a simulated echo and applying it to the range determining component of the radar system at substantially the same time an echo signal was due to be received by the radar system thereby resulting in a range indication approximately equal to the true range.

A still another object is to provide in a mobile pulse-echo range measuring system a pulse demodulator for generating a simulated echo pulse for a lost echo and applying it to the distance determining component of the pulse-echo system at a predetermined increment of time after the lost echo should have been received had the range of the system remained stationary, the predetermined increment of time corresponding to a given increment of distance as determined by the rate of movement of the mobile pulse-echo system.

And a still further object is the provision, in an ultrasonic pulse-echo depth recording system for a mobile subaqueous vehicle utilizing the shortest-path echoes reflected from the air-water interface for continuously measuring the running depth of the vehicle, of echo loss compensating means for generating a simulated echo for each lost shortest-path echo and applying it to the range determining circuit of the recording system at a predetermined interval of time after the lost echo should have been received had the range remained constant, the predetermined interval of time increasing a predetermined increment for each succeeding simulated echo in a series of successively generated simulated echoes applied to the range determining circuit to thereby add a given known increment of range to each succeeding range indication.

And a still another object is to provide a variable width square-wave generator having means operatively associated therewith to automatically control the pulse generation of the generator in such a manner that the generator produces a sequence of square-waves wherein each square-wave has a width exceeding the width of the preceding adjoining pulse by a fixed predetermined increment.

Another object is to provide a variable-width pulse generator for a pulse-echo range measuring system to produce pulses having widths correlative to the transit time of received reflected pulses, and a pair of one-shot multivibrators alternately supplying simulated echoes to the generator as long as no true echoes are received.

A primary object of the invention is the provision of an ultrasonic pulse-echo acoustic depth recorder on a mobile submarine vehicle to continuously measure and record the running depth of the vehicle by determining the transit time of the shortest-path echoes of the ultrasonic pulses reflected from the air-water boundary surface including clamping means for disabling the receiver circuit during transmission of the transmitted pulses, lock-out circuit means for passing the shortest-path echoes of the transmitted pulses and excluding subsequent extraneous echoes caused by inhomogeneity of the reflecting surface, a variable-width square-wave generator initiable at the instants of pulse transmission and shortest-path echo reception for generating a pulse having a width representatively corresponding to the time elapsed between pulse transmission and the reception of its shortest-path reflected echo, and echo loss compensating means operatively associated with the square-wave generator for supplying simulated echoes to the generator as long as no true shortest-path echoes are received.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
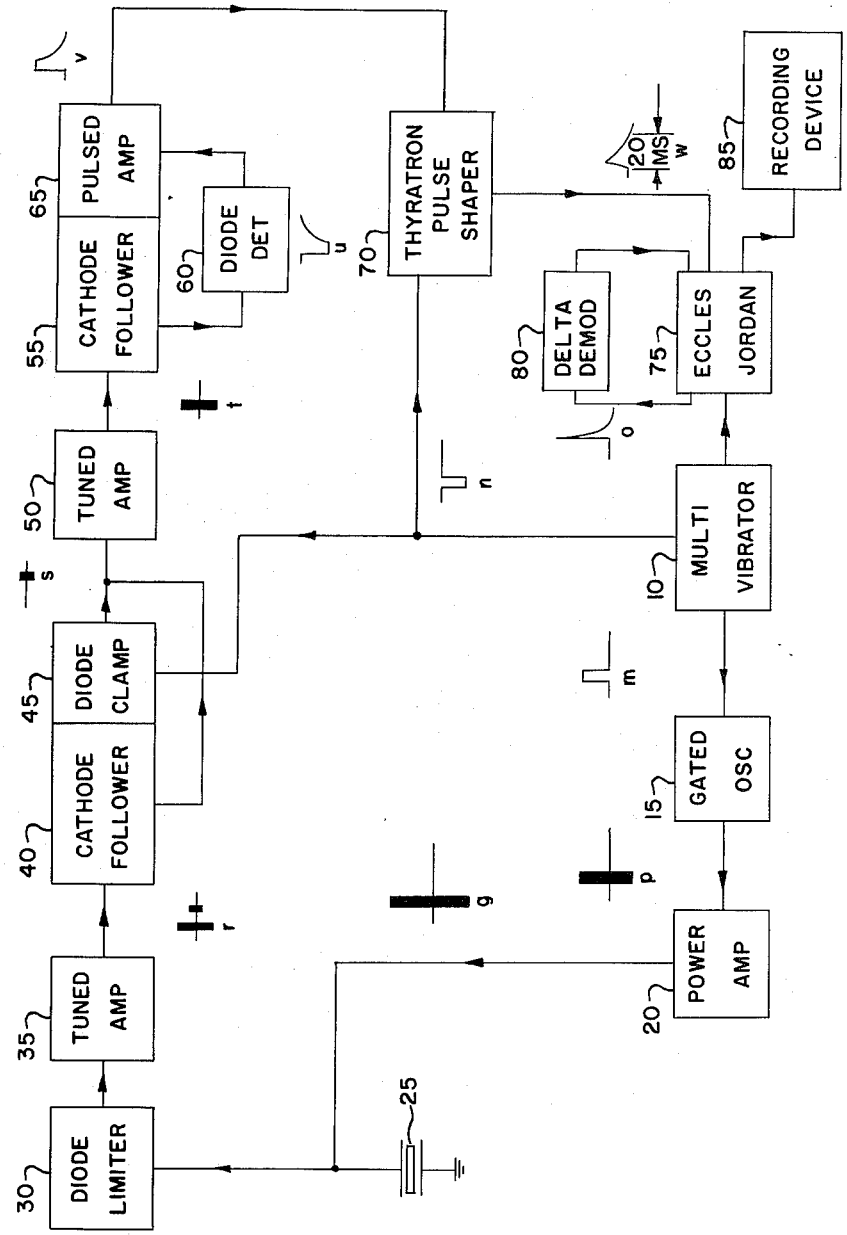
Fig. 1 shows a block diagram of the circuit arrangement of the invention.

Referring now to the drawings, wherein like reference characters designate like or corresponding parts throughout the several figures, there is shown in Fig. 1 a block diagram of the ultrasonic pulse-echo depth recorder comprising a transmitting circuit composed of a highly unbalanced free running multivibrator 10, an oscillator 15 producing oscillations at a frequency of approximately .25 mc., a power amplifier 20, and a transducer 25 which is adaptable to transmit ultrasonic impulses and receive the reflected echoes thereof. The receiver circuit includes a diode limiter 30, tuned amplifier 35 for amplifying the received pulses, a cathode follower 40 with a diode clamp circuit 45 for blocking-out the main bang of the transmitted impulses and passing only the reflected echoes, a tuned amplifier 50 for amplifying the reflected echo signals, a cathode follower 55 with a diode detector 60 for detecting and rectifying the echo signals, a pulsed amplifier 65 for inverting the detected echo signals, and a thyratron pulse shaper 70 acting as a lock-out device to pass the main or shortest-path echoes and exclude the extraneous false echoes received between the main echoes thereby producing a triggering spike for each main echo received. An Eccles-Jordan circuit 75 is connected to receive a triggering pulse from multivibrator 10 coincident with each transmitted impulse to change its first, or inherent, condition of stable operation, which shall hereinafter be referred to as the off state, to its second condition of stable operation, which shall hereinafter be referred to as the on condition of operation. The Eccles-Jordan circuit remains in this second, or on, condition of stable operation until it is triggered by the triggering spike from pulse shaper 70, upon which occurrence the Eccles-Jordan circuit is returned to its inherent condition of operation. This action of the Eccles-Jordan circuit results in the generation of a square-wave having a width proportional to the transit time of the transmitted impulse and its reflected shortest-path echo and being correlative to the depth of the submarine vehicle. A recording device 85 is connected to the square-wave output of the Eccles-Jordan circuit to derive and record an indication of the depth of the submarine vehicle. A delta demodulator 80 is connected across the Eccles-Jordan circuit to supply a simulated echo triggering pulse thereto in the absence or loss of a shortest-path echo.

In operation, the pulse width and repetition interval are set by the multivibrator 10, the ratio of repetition interval to pulse width being preferably 50 to 1. Absolute repetition time determines the maximum depth that can be recorded while pulse width determines both minimum recordable depth and the required amplifier bandpass for most consistent echo detection. The multivibrator 10 provides three separate signals; namely, a positive square-wave pulse, shown as $m$, to gate the oscillator 15, coincident with this a negative square-wave pulse $n$ is applied to the diode clamp circuit 45 and to the shield grid of the thyratron 70 to effectively disable the receiver circuit during the instants of impulse transmission, and a third signal $o$, corresponding to the leading edge of the positive and negative pulses, is applied to the Eccles-Jordan circuit 75 to set it in the on state, as described heretofore.

The R. F. pulse generated by the gated oscillator 15 excites the power amplifier 20, which in turn drives the acoustic transducer 25. The output of power amplifier 20 is also applied, through diode limiter 30, to the input of amplifier 35. However, the limiting action of the limiter 30 and the negative off gate signal applied to the diode clamp 45 and thyratron 70 prevent signals from appearing at the input of amplifier 50, as shown by waveshape $s$ which shows the echo signal less the transmitted pulse which was present at the tuned amplifier 35 as shown by waveform $r$.

After an unlocking interval, which follows the transmitted impulse and which is controlled by the time constant of the diode clamp circuit 45, the tuned amplifiers become active and await the echo signal from the transducer. After an interval corresponding to the time required for the pulse to travel to the air-water surface and return, an echo signal will appear. Since the echo signal is, in general, smaller in amplitude than the transmitted pulse, limiting action by the diode limiter 30 is practically nonexistent. The echo is amplified by amplifier 50, as shown at $t$, and the negative envelope obtained by a germanium-diode detector 60, as shown at $u$. This negative envelope is further amplified and inverted in an amplifier 65, as shown at $v$.

Because of the irregular character of the air-water interface, there are many points on the surface that reflect signals and no single echo signal exists. The main or shortest-path echo is followed by a series of irregular echoes of diminishing amplitude. To prevent these false echoes from activating the recorder circuits, a lock-out device is employed following the pulse amplifier 65. The leading edge of the shortest-path echo fires the thyratron 70 which immediately prevents any false echoes from affecting the timing circuits for a period determined by an R-C time constant circuit associated with the thyratron tube and subsequently to be described. This time constant is normally adjusted for 20 percent of the repetition interval since experience has shown that any false echoes appearing after that time are of such small amplitude as to cause no malfunction of the recorder. Although the time constant is preferably selected to be 20 percent of the repetition interval, it is to be understood that this is not a limiting percentage but that any desired percentage, depending upon the operating circumstances, may be used.

The thyratron 70 develops a trigger spike, shown at $w$, in response to the shortest-path echo and applies this trigger spike to the Eccles-Jordan circuit 75 to return it to the off state. Thus, the Eccles-Jordan circuit generates a square wave of constant height whose width is proportional to depth. An increase in depth results in a square wave of increasing width. The generated square wave is applied to a recording device 85 which utilizes the width of the square wave to derive and record the depth indication.

In order to avoid large errors in the depth indication caused by random repeated echo loss, a delta demodulator 80 is operatively associated with the Eccles-Jordan circuit. The term delta demodulation shall herein be construed to mean that, each time an echo is absent, a given known increment of depth will be added to the depth indication of the previous frame. The delta demodulator 80 is so operatively interconnected with the Eccles-Jordan circuit 75 that, if a true echo is received, the demodulator action is nonexistent, but, if an echo is subsequently lost, the demodulator will sense this loss and will apply a simulated echo triggering pulse to the Eccles-Jordan circuit at a predetermined increment of time after an echo should have been received had the depth been the same as in the preceding frame to thereby cause the Eccles-Jordan circuit to generate a square wave of width equal to the width of the preceding square wave plus an incremental increase, the incremental increase hereinafter being referred to as delta. The time interval, delta, should be as small as possible to introduce the minimum amount of error in any frame. The lower limit on delta is set by the rate at which the target position is varying. Delta cannot be made less than the maximum change in echo transit time corresponding to the maximum range change of the target during one repetition frame.

Assuming the transmission velocity in the medium to be $v$ feet per second and the maximum rate of change of target range during the interval $t$ seconds to be $r$ feet per second, where $t$ is the repetition interval, the minimum value for delta is then $$\frac{tr}{v}$$

seconds. Percentagewise this error will be a maximum at the shortest range of interest, but this is not as serious as it might initially appear. For example, assuming that every fifth echo is absent, range is essentially constant and at its minimum value over the interval of interest since the repetition intervals are short and the rate of change of the target range is very slow; and, delta is made equal to 10 percent of the pulse width corresponding to minimum range. If the square wave is integrated to produce an average range value, the average error due to the loss of echo sequence is only 2 percent. Without the demodulator and under the same conditions the error would be 20 percent.

In practice it is possible to establish the value of delta at approximately ±2 percent thereby obtaining a still greater improvement in accuracy. Secondly, and most important, the probability of echo loss at short range is negligible. Only when the target is located at a great range do such factors as scattering, absorption and secondary reflections introduce a sizable amount of echo loss. The specific circuitry of the delta demodulator is shown in Fig. 3 and will be described in conjunction with Fig. 2.

Figure 5:
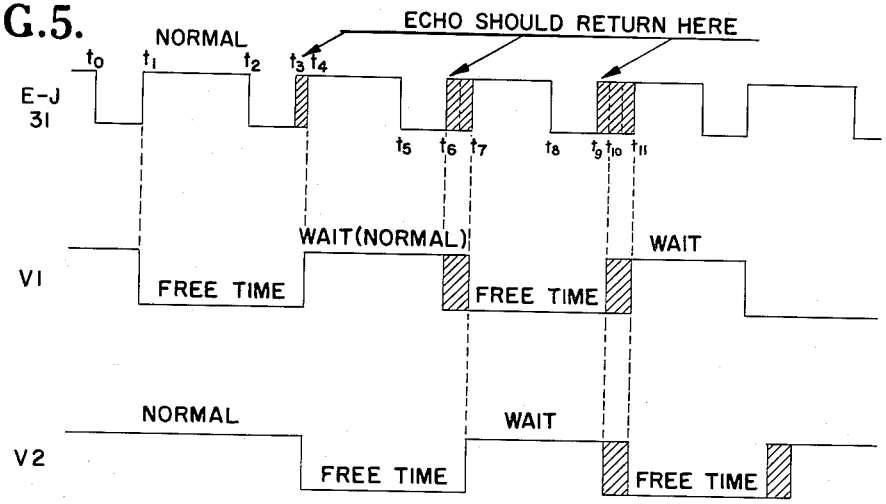
Fig. 5 represents the waveforms present on the plates of the Eccles-Jordan circuit and the multivibrators of the delta demodulator.
Figure 3:
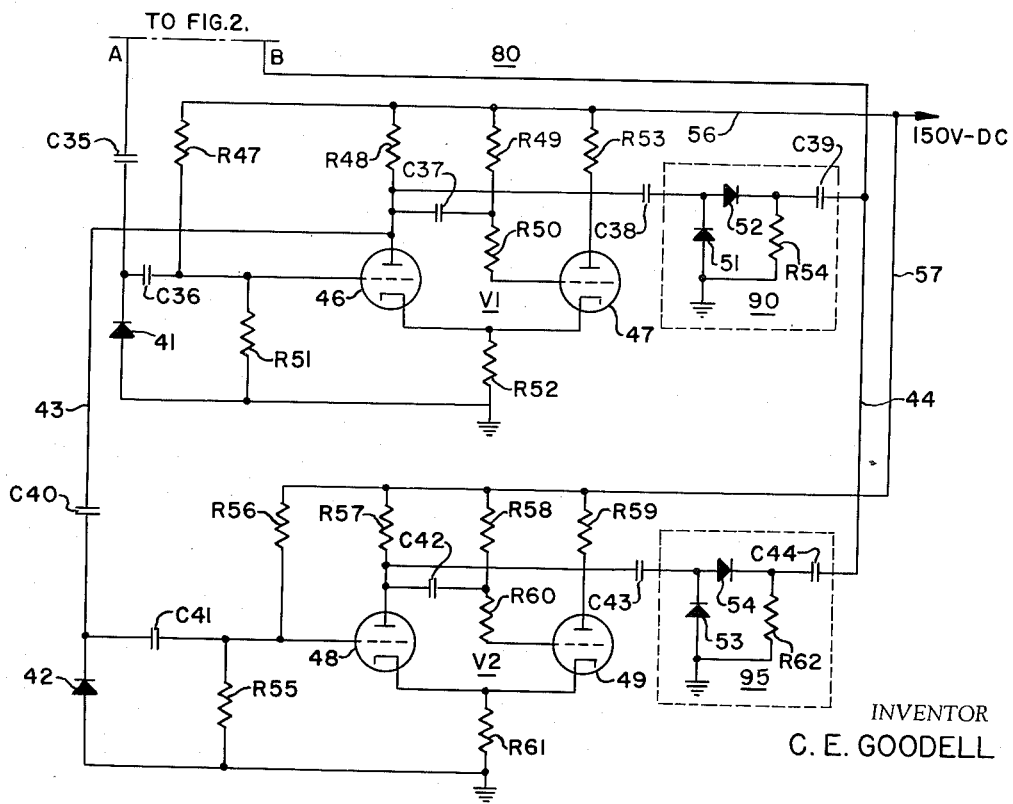
Figure 4:
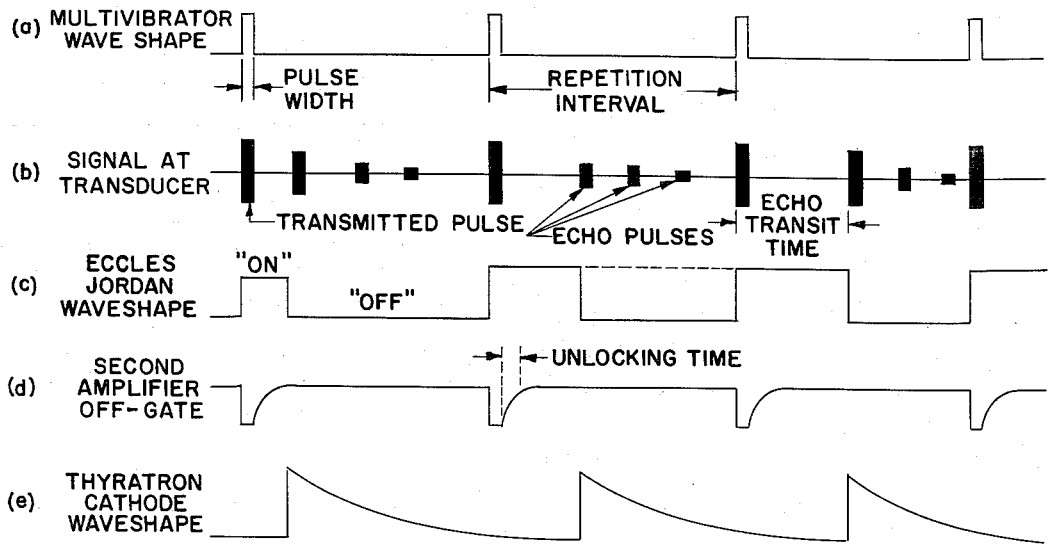
Fig. 4 illustrates the waveforms present at various portions of the circuit of the invention.

Fig. 4 illustrates the waveshapes present at various points in the circuit of Fig. 1 and is self-explanatory; and Fig. 5 illustrates the waveforms on the plates of the Eccles-Jordan circuit and the delta demodulator and will subsequently be explained with Figs. 2 and 3.

Figure 2:
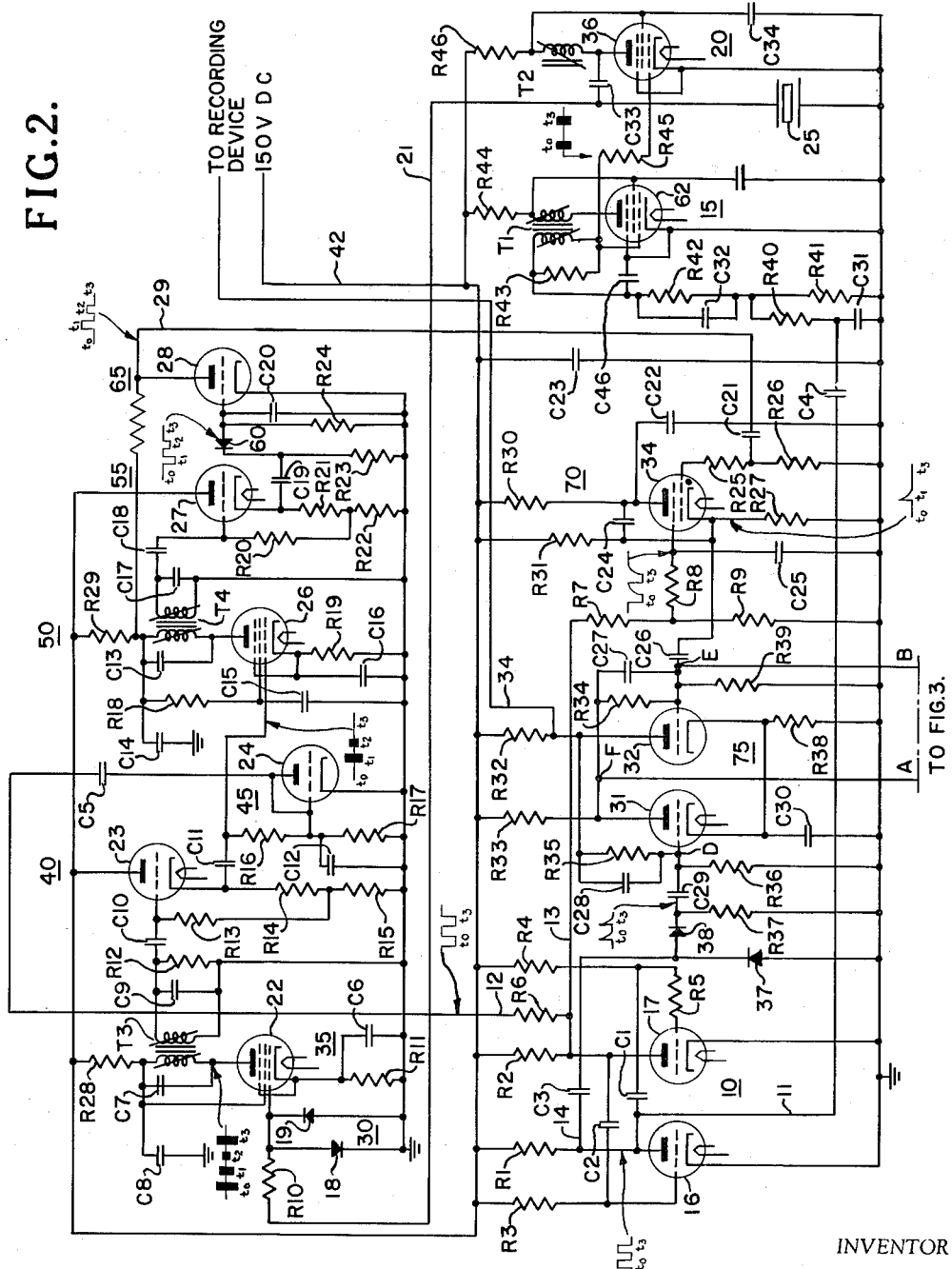
Figs. 2 and 3 illustrate schematically the preferred specific circuitry of the invention.

Referring now to Fig. 2, wherein is shown the specific circuit arrangement of the invention, multivibrator 10 comprises a pair of cathode grounded triodes 16 and 17 having D. C. plate voltage supplied thereto from conductor 42 through plate resistances R1 and R2, respectively, and grid bias supplied thereto from line 42 through biasing resistors R3 and R4, respectively. The plate of tube 16 is connected through condenser C1 and resistor R5 to the grid of tube 17, and the plate of tube 17 is connected through condenser C2 to the grid of tube 16 thereby to effect multivibrator action. The square-wave pulse output $t_0$, $t_3$, shown as a waveform at the plate of tube 16 is applied through line 11 and condenser C4 to the control grid of oscillator 15 through resistance-capacitance networks R40, R41, C31 and R42, C32 thereby to gate oscillator 15.

Oscillator 15 includes a pentode tube 62 having plate voltage supplied thereto through resistor R44 and the secondary winding of transformer T1, the secondary winding of T1 functioning as the oscillator feedback tickler coil and interconnects the control grid of tube 62 with its anode. The suppressor grid is directly connected to the cathode which is at ground potential. The primary winding of T1 is shunted by damping resistor R43 and is connected in series with condenser C46 between the control grid suppressor grid. The R. F. impulses $t_0$, $t_3$ appear at load resistor R45 and are applied to the control grid input of power amplifier 20.

Power amplifier 20 consists of a cathode grounded pentode 36 having anode potential supplied thereto through plate resistor R46 and choke T2. The suppressor grid is connected to the cathode, and the screen grid is connected to resistor R46 and to ground through condenser C34. The output of power amplifier 20 is supplied to acoustic transducer 25, which is connected across the anode-cathode circuit of tube 36 and to the diode limiter 30 through lead 21 and limiting resistor R10. The transducer 25 is adaptable to transmit the impulses generated by oscillator 15 and multivibrator 10 and to receive the reflected echoes of the transmitted impulses. The received echoes are applied from transducer 25 through conductor 21 and resistor R10 to the input of the receiving circuit.

The diode limiter 30 contains a pair of oppositely-poled parallel-connected diodes 18 and 19 which are connected across the control grid-cathode input circuit of tuned amplifier 35 which comprises a pentode tube 22 having plate resistance R28, tuned circuit C7 and primary winding of transformer T3 in the plate supply circuit and having its suppressor grid tied to its cathode which is grounded through R-C network R11 and C6. The waveforms present and shown at the plate of tube 22 are the main bang $t_0$ and $t_3$ of the transmitted impulses $t_0$ and $t_3$, the shortest-path echo $t_1$, and an extraneous echo of diminished amplitude $t_2$ from scattering and irregular reflection of the air-water reflecting surface.

The output of amplifier 35 is transformer coupled through T3 to the input of cathode follower 40 which comprises a triode 23 that has a tuned input circuit consisting of the secondary winding of T3 and condenser C9 shunted by damping resistor R12. One side of the tuned circuit is connected to the grid through coupling condenser C10 and the other side is connected to ground. The cathode load circuit consists of resistors R14 and R15, and the grid is connected to the R14—R15 junction through grid biasing resistor R13.

The output appearing across load resistors R14—R15 is applied through R-C coupling circuit C11 and R16 to diode clamping circuit 45 which includes a triode 24 having its anode and grid tied together to act as a diode and an R-C time constant network C12 and R17. The multivibrator 10 applies, through resistor R6 and conductor 12, negative impulses $t_0$ and $t_3$, as shown by the waveform on conductor 12, coincident with the transmitted impulses to the plate of triode 24 to drive the anode negative with respect to the cathode which in turn applies a negative disabling bias potential to the control grid of tube 26, thereby rendering triode 24 nonconductive at the instant of impulse transmission and for a predetermined interval of time as determined by the time constant of R-C network C12—R17. After C12 has discharged sufficiently through resistor R17, as determined by their parametric time constant values, triode 24 and tube 26 become conductive to pass the reflected echo signals $t_1$ and $t_2$, as shown by the waveform present on the plate of tube 24, and to subsequently become nonconductive at time $t_3$ upon application of a negative impulse from multivibrator 10 whereupon clamping action by tube 24 again takes place. From the above, it is seen that diode clamp 24 functions to block the main bangs of the transmitted impulses and passes the reflected echo signals. The echo signals passed by diode clamp circuit 45 are applied to the control grid of tube 26 of the tuned amplifier circuit 50.

The tuned amplifier circuit 50 comprises a pentode 26 which receives its plate voltage through resistor R29. The cathode is biased to ground through resistor R19 shunted by capacitor C16, and the screen grid is connected to ground through resistor R18 serially connected to capacitor C14. The output of amplifier 50 appears at the tuned circuit consisting of condenser C13 and the primary winding of transformer T4, the output tuned circuit of amplifier 50 being transformer coupled to the input tuned circuit, comprising the secondary winding of T4 and condenser C17, to cathode follower 55.

Cathode follower 55 includes triode 27 having load resistors R21—R22, grid bias R20, and having its input tuned circuit connected to its control grid through coupling condenser C18. The output appearing at load resistors R21—R22 is applied through coupling R-C network C19—R23 to detector 60 which rectifies the received echo signals to derive the negative envelope thereof, as shown by the indicated waveform.

The detected negative envelope is applied to inverter-amplifier 65 which comprises a triode 28. The inverted signal present at the output plate circuit of tube 28 is applied through line 29, coupling condenser C21, resistor R25 to the control grid of thyratron tube 34 of pulse shaper circuit 70.

The pulse shaper circuit 70 consists of a thyratron tube 34 having plate voltage supplied thereto through resistor R30 and load resistor R27 connected to the cathode, the resistors R25—R26 providing grid bias. At the instants of impulse transmission, the multivibrator 10 applies a negative impulse through conductor 13 and resistors R7 and R8 to the shield grid of thyratron tube 34 to thereby render the thyratron tube 34 nonconductive during the instantaneous intervals of impulse transmission of the system, the thyratron tube 34 returning to normal operating condition thereafter to await the echo signals. Upon inverter-amplifier 65 applying the echo signals to the control grid of thyratron 34, the leading edge of the shortest-path echo, shown as $t_1$, fires thyratron tube 34 which immediately prevents any subsequent false echoes, such as the echo shown at $t_2$, from affecting the thyratron shaper circuit 70 for a period of time controlled by the time constant of R-C network composed of resistor R27 and condenser C24. In response to the leading edge of the shortest-path echo $t_1$, the thyratron tube 34 develops a trigger spike across load resistor R27, as shown by the indicated waveform. Thus, thyratron tube 34 acts as a lock-out device which passes the shortest-path echo and prevents subsequent false echoes from activating the recorder circuits following the thyratron. The trigger spike appearing across load resistor R27 is then applied to input E of the Eccles-Jordan circuit 75.

A conventional Eccles-Jordan flip-flop circuit 75, including a pair of triodes 31 and 32 and having a pair of inputs indicated at D and E, is employed to generate square-wave pulses having widths correlative to the depth of the submarine vehicle upon which the echo-ranging system is mounted. The multivibrator 10 supplies square-wave pulses, coincident with the transmitted impulses, through line 14 and condenser C3 to a peaking, or differentiator, network comprising copper-oxide rectifiers 37 and 38 which in turn apply peaked triggering pulses corresponding to the leading edge of the transmitted impulses to input D through coupling condenser C29 to change the first, or inherent, stable condition of operation of the Eccles-Jordan circuit 75 to its second stable condition of operation to set it in the "on" state where it remains until the thyratron circuit 70 applies the triggering spike to input E to return the Eccles-Jordan circuit to its first condition of stable operation thereby resulting in the generation of square-wave pulses of constant amplitude and having widths determined by the time elapsed between the instant of impulse transmission and the reception of its reflected shortest-path echo. Any increase in depth results in a square-wave of increasing width.

The square-wave pulses generated by the Eccles-Jordan circuit 75 are applied through line 34 to a recording device wherein the generated square-wave pulses are utilized to produce and record an indication of the depth.

In order to minimize range errors due to echo loss, the invention contemplates the provision of a demodulator network to apply simulated echoes to the Eccles-Jordan circuit 75 at input E for each shortest-path echo that is lost. The Eccles-Jordan circuit 75 is connected at point F through lead A and at point E through lead B to the delta demodulator circuit 80 shown in Fig. 3.

Referring now to Fig. 3, the delta demodulator circuit 80 comprises a pair of one-shot multivibrators, indicated generally at V1 and V2, and a pair of differentiator networks 90 and 95 connected to the outputs of multivibrators V1 and V2, respectively. The multivibrator V1 consists of a pair of triodes 46 and 47 having a common cathode bias R52, grid bias R47 and R50 respectively, and plate resistors R48 and R53 respectively. Condenser C37 and resistor R49 intercouple the anodes of tubes 46 and 47 and provide the time constant discharge characteristic for multivibrator action. Connected to the input of tube 46 is a differentiator network C36 and R51, preceded by a rectifier 41, the rectifier 41 and differentiator C36—R51 being connected through condenser C35 to point F of the Eccles-Jordan circuit 75 (Fig. 2). The output of multivibrator V1 is coupled through coupling condenser C38 to differentiator network 90 which consists of a pair of rectifiers 51 and 52 connected with resistor R54. The output of differentiator 90 is applied through conductor B to Eccles-Jordan input E. The output of multivibrator V1 is also applied through lead 43, condenser C40, rectifier 42, differentiator C41—R55 to the input of multivibrator V2. The construction and circuitry of multivibrator V2 and of differentiator network 95 are similar to multivibrator V1 and differentiator 90, respectively. The output of multivibrator V2 is applied through differentiator 95 and conductors 44 and B to input E of the Eccles-Jordan circuit 75. From the arrangement shown in Fig. 3, it is seen that the main components of the delta demodulator comprises a pair of one-shot multivibrators V1 and V2 connected in cascade.

In operation of the delta demodulator circuit of Fig. 3 in conjunction with the Eccles-Jordan circuit 75 of Fig. 2 and referring to the waveforms of Fig. 5 wherein are shown, in the order named, the waveforms on the plate of tube 31 of the Eccles-Jordan circuit 75, and on the plates of tubes 46 and 48 of multivibrators V1 and V2, respectively, at time $t_0$ the same trigger that initiates the transmitted impulse is fed to the grid of Eccles-Jordan tube 31 and causes tube 31 to conduct resulting in a negative step at its plate as shown in Fig. 5 (E—J 31). This step is passed through condenser C35 (Fig. 3) and shorted to ground by rectifier 41 thereby having no effect on tube 46 of multivibrator V1. At time $t_1$ the detected positive echo is fed from thyratron 70 (Fig. 2) to input E of the Eccles-Jordan circuit 70 to change the state of equilibrium of the Eccles-Jordan circuit which produces a positive step on the plate of tube 31 as shown at $t_1$ in Fig. 5 (E—J 31). The square wave between $t_0$—$t_1$ is a measure of the depth of the torpedo. This step at $t_1$ passes through C35 (Fig. 3), is differentiated by C4—R4 and applied to the grid of tube 46. This action changes the state of V1 where it remains for a free period determined by the discharge characteristics of C37 and R49, the free period being preselected and shown to extend from time $t_1$ to $t_4$ in Fig. 5 (V1).

At time $t_4$, the end of this free period, multivibrator V1 returns to its normal state with a positive step on the plate of tube 46, as shown at $t_4$ in Fig. 5 (V1). Meanwhile, at $t_2$, another transmitted impulse has gone out, and has changed the state of the Eccles-Jordan circuit with a negative step on tube 31 (Fig. 2). This step is again prevented by rectifier 41 from reaching tube 46 of multivibrator V1. The reflected echo from this transmitted impulse, at $t_3$, would change the state of the Eccles-Jordan circuit back to its normal state. If the echo that should have arrived at $t_3$ were lost the Eccles-Jordan circuit would not return to its normal state but would continue in its existing state of operation; and, at time $t_4$ the multivibrator V1 returns to its normal waiting state with a positive step on the plate of tube 46. This step is differentiated through network 90 and applied to the grid of tube 32 (Fig. 2) at input E, returning the Eccles-Jordan circuit 70 to its normal condition at time $t_4$, thereby indicating a depth greater than the depth shown in the previous frame by an incremental increase, delta, the shaded area shown between $t_3$ and $t_4$ in Fig. 5 (E—J 31).

At $t_4$ the positive step from multivibrator V1 is also applied through condenser C40 to the differentiating network C41—R55 and thence to the grid of tube 48 changing the state of multivibrator V2 which remains in this changed state for a free period determined by the discharge characteristics of C42 and R58. This period is set equal to the free period of multivibrator V1. At $t_7$, the end of this free period, multivibrator V2 returns to its normal state producing a positive step, as shown at $t_7$ in Fig. 5 (V2). This step is differentiated through differentiator network 95 and applied through leads 44 and B to input E of Eccles-Jordan circuit 75. If an echo has been received, the grid of tube 32 (Fig. 2) will already have been driven positive at $t_6$ by the echo signal applied to input E by thyratron 70, and the positive pulse at $t_7$ from multivibrator V2 will have no effect. If, however, no echo has been received, the positive pulse from multivibrator V2 to input E will drive the grid of tube 32 positive to return the Eccles-Jordan circuit to its normal state, thereby again resulting in a depth indication greater than the depth indication of the previous frame by an incremental amount, delta. Also, at time $t_7$, with the Eccles-Jordan circuit being driven to its normal state by the simulated echo from multivibrator V2, the plate of tube 31 (Fig. 2) makes a positive step which is applied through lead A and condenser C35 to the input of multivibrator V1 to actuate the free period again, as shown at $t_7$ in Fig. 5 (V1), this free time extending to $t_{11}$ at which time multivibrator V1 would apply a simulated echo to input E if no true echo had been received and would also apply a positive pulse to multivibrator V2 to initiate its free time. If an echo had been received at time $t_6$, the free time of V1 would have been initiated at time $t_6$ and would have terminated at time $t_{10}$, at which time it would have applied the simulated echo to input E and a positive pulse to V2 to initiate the free time thereof.

It is to be noted that the incremental increase, delta, added to each succeeding frame, during a series of lost echoes, is constant; that is, the cumulative increase between $t_6$ to $t_7$ includes two equal incremental increases and the cumulative increase between $t_9$ to $t_{11}$ includes three equal incremental increases, each of the incremental increases being equal to the incremental increase between $t_3$—$t_4$.

The aforedescribed action of multivibrators V1 and V2 alternately supplying simulated echoes will continue as long as no true echoes are received. The purpose of the two networks 90 and 95 is to prevent the positive step at $t_1$, $t_3$—$t_4$, $t_6$—$t_7$, from driving V1 or V2 positive at the same time this step on the grids of V1 or V2 is trying to drive the plates negative. These networks also prevent negative steps from V1 or V2 from driving the grid of tube 32 of the Eccles-Jordan circuit 75 negative again at $t_4$, $t_7$, in the event a true echo has already driven the grid positive.

If a series of true echoes are lost, the incremental increases, delta, are cumulative. For example, if three consecutive true echoes are lost, as illustrated in Fig. 5, the indicated range for the third lost echo is the last true range $(t_0-t_1)$ plus $n \times$ delta $(3 \times t_3-t_4=t_9-t_{11})$, where $n$ is the number of lost echoes. In the illustration of Fig. 5, it is assumed, for purpose of explanation, that the range is constant, and, accordingly, time intervals $t_0$—$t_1$, $t_2$—$t_3$, $t_5$—$t_6$ and $t_8$—$t_9$ are shown as being equal since the true echoes should return at times $t_1$, $t_3$, $t_6$, and $t_9$. In practice, where the submarine vehicle is moving and continuously increasing its range from the air-water interface, if true echoes were received they would not have arrived at times $t_3$, $t_6$ and $t_9$, as illustrtaed, but instead would have arrived at times approaching, but before, times $t_4$, $t_7$ and $t_{11}$, since the incremental increase, delta, is preselected to be as small as possible but not less than the maximum change in echo transit time corresponding to the maximum change in range during one repetition frame, as explained hereinabove.

Because it is impossible to predict all the loss of echo sequences and target position variations that can occur, it is difficult to analyze the demodulator behavior under all situations. However, if certain simplifying assumptions are made it is possible to derive relationships useful in determining the best circuit operating criteria. If repetition rate is fast or target position changes slowly, the range can be considered essentially constant and the following generalized statements are possible:

With constant range, no matter how many consecutive echoes are lost, up to the limit defined under Eq. 1 following, upon the receipt of either one or two successive echo pulses the system will re-establish its in-step operation. Only one echo need be received to pull in step if an odd echo number of successive echoes have been lost, whereas two successive echoes are required to pull the system in step if an even number of consecutive echoes have been lost.

If the range is constant then no matter how many consecutive echoes are lost, up to the limit defined under Eq. 1, the system will always re-establish its in-step operation if a like number of successive echoes are received.

If loss of echo sequence is not successive the following relationships hold:

If an even number of echoes are initially lost and only one echo received, followed by another sequence of echo loss, sum the total number of echoes lost and subtract the number of echoes received. If the resultant number is odd then the subsequent receipt of one echo will establish the in-step operation.

If an odd number of echoes are lost in any sequence followed by the receipt of one echo, in-step operation is re-established.

If range is constant, the maximum number of successive echoes which may be lost before malfunction occurs is stated by the following limit:

Eq. 1 $$(T-t)\left[1-\frac{\Delta(M+2)}{(T-t)}\right]>0$$

where:

$T$ = repetition period.
$t$ = pulse width corresponding to the fixed range.
$\Delta$ = incremental time due to demodulator.
$N$ = number of successive echoes lost.
$M = f(N)$, tabulated below

| | |
|---|---|
| $M=0$ | $N=0, 1$ |
| $M=2$ | $N=2, 3$ |
| $M=4$ | $N=4, 5$ |

If $\Delta$ bears a relative prime relationship to the quantity $(T-t)$, the system will automatically re-establish its in-step operation even if the limit defined by Eq. 1 is exceeded. This re-establishment will take place after a time corresponding to the total time during which the loss of echo occurred.

Although the present invention contemplates the utilization of the delta demodulator to produce simulated echoes in order to compensate for range errors, other error compensation expedients, which are inferior to the delta demodulation method, may be employed to replace the delta demodulator to partially compensate for range errors. Although the methods subsequently to be described may be substituted for the delta demodulation system with some degree of success in error compensation, it is to be understood that the invention herein disclosed is directed to an echo-ranging system incorporating the aforedescribed delta demodulator and that the methods that follow are described for the purpose of illustrating other error compensation expedients which, though unsatisfactory in obtaining a high degree of accuracy in depth recordation, are operable and practicable.

One method is to integrate the square-wave output generated by the Eccles-Jordan circuit in response to a reflected pulse to produce a D. C. potential proportional to depth. This signal could then actuate a conventional strip-chart recorder. However, if loss of echo occurs, it will result in an erroneous recordation of sudden increase in apparent depth. If it is known that the torpedo or mine cannot possibly change depth as suddenly as might be indicated, this indication could be disregarded; but, if a series of echoes are lost, valuable desired information and data are lost in disregarding the erroneous recordations thereby resulting in the acquisition of incomplete information.

Another method that indicates malfunction of the recorder is to record the square wave on moving film. Any loss of echo is indicated immediately by a sudden widening of the square wave that returns to normal width within the next frame. This system is unsatisfactory from the standpoint of record analysis in that it requires point-by-point scaling of depth indications on a considerable quantity of film.

Figure 6:
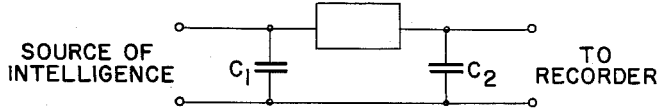
Fig. 6 illustrates another circuit for detecting echo loss.
Figure 6:
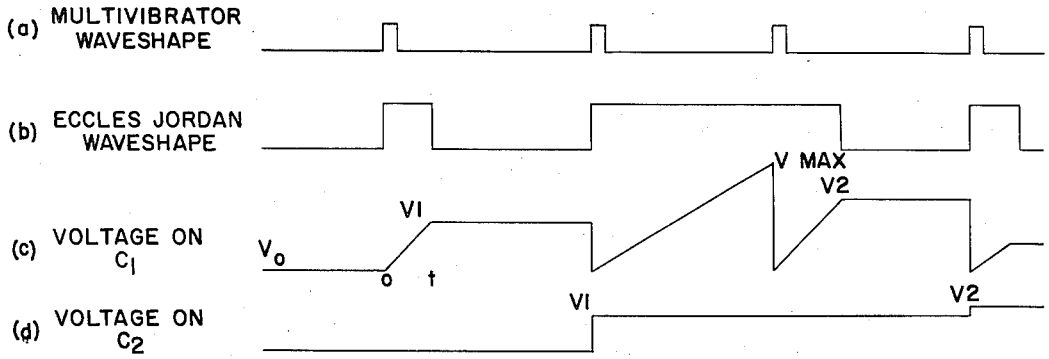

Another method that could be employed is the utilization of a modified boxcar demodulator, shown in Fig. 6 (A), interconnected between the Eccles-Jordan output and the recorder. The operation of this circuit is explained with reference to the waveforms of Figs. 6 ($a$ to $d$). Capacitor $C_1$ is charged linearly in each pulse repetition interval from a potential $V=V_0$ at $t_0=0$, from the Eccles-Jordan circuit when it is changed from its normal state at the instant of impulse transmission, to $V_1$ at time $t$ by the received echo, where it is clamped until the end of the interval, as shown in Fig. 6($c$). Time $t_4-t$ corresponds to pulse transit time. At the end of the pulse repetition interval, potential $V_1$ is transferred to capacitor $C_2$ whose potential remains clamped throughout the next repetition interval while $C_1$ returns to $V_0$. In the event that no echo is received, $C_1$ continues to charge until it attains its maximum value $V_{max}$ thereby indicating loss of echo. Meanwhile $C_2$ maintains the potential determined during the preceding interval and $C_1$ is again discharged at $V_0$. Extrapolation is effected over a repetition interval for which no new information is available. In this manner, no false recordings would be obtained, but as a consequence desired information is lost.

From the foregoing, it will be apparent that an acoustic depth recorder has been devised which utilizes the air-water interface as the reference for depth determination of mobile subaqueous vehicles and which employs simulated echoes for lost echoes in order to compensate for range errors due to echo loss.

Although the tubes of the Eccles-Jordan circuit and of the multivibrators are shown to be separate triodes, it is to be understood that dual triode tubes may be employed.

Obviously many modifications and variations of the present invention are possible in the light of the above teachings. It is therefore to be understood, that within the scope of the teachings herein and the appended claims, the invention may be practiced otherwise than as specifically described.

What is claimed and desired to be protected by Letters Patent of the United States is:

1. A mobile distance measuring transceiver system for continuously measuring the distance of a given reflector comprising transmitting circuit means for producing and emitting ultrasonic signals, receiving circuit means for receiving said signals after reflection from the given reflector, distance determining means in operative circuit relation with said transmitting and receiving circuit means for measuring the transit time of the transmitted signals and their respective received reflected signals, and distance-error compensating means operatively associated with said distance determining means for producing and applying simulated reflected signals to said distance determining means in the absence of received reflected signals from the given reflector.

2. A pulse-echo range measuring system borne by a moving body for continuously measuring the distance thereof from a reference reflector comprising, in combination, means for producing a continuous series of sound impulses, means for receiving said sound impulses after reflection from said reference reflector, measuring means responsive to said produced impulses and to the received reflected impulses thereof for measuring the transit time of the produced impulses and their respective received reflected impulses, and reflected impulse loss compensating means having time determining means for generating and applying simulated reflected impulses to said measuring means in the absence of received reflected impulses within an interval of time after the production of their respective produced impulses.

3. A pulse-echo range measuring recorder borne by a mobile vehicle for measuring and indicating the instantaneous distance variations thereof from a reference reflector comprising, in combination, signal generating circuit means for producing ultrasonic impulses, transducer means for radiating said ultrasonic impulses and for receiving the echoes thereof reflected from said reference reflector, receiver circuit means coupled to said transducer for receiving said echoes, a variable-width pulse generator operatively initiable at the instants of ultrasonic impulse production and operatively terminable at the instants of reception of their respective echoes to develop pulses of widths correlative to the transit time of the radiated ultrasonic impulses and their respective received echoes, recording means for integrating said developed pulses to produce and record indications representative of the instantaneous distance variations, and simulated echo generating means for applying simulated echoes to said pulse generator in the absence of received reflected echoes within an interval of time after radiation of their respective produced ultrasonic impulses.

4. In a mobile pulse-echo distance determining system for continuously measuring the instantaneous distance variations of a reference reflecting surface by transmitting impulses and receiving the echoes thereof reflected from said reflecting surface, the combination comprising a variable-width square-wave generator responsive to said transmitted impulses and their respective echoes for generating a square wave having a width representatively corresponding to the elapsed time between the instants of impulse transmission and the instants of reception of their respective echoes, means utilizing said generated square waves for continuously recording the instantaneous distance variations, and means operative in the absence of received echoes of transmitted impulses to automatically control said generator so that it generates a sequence of square waves wherein each square wave has a width exceeding the width of the precedingly adjacent square wave by a fixed predetermined increment.

5. In a transmit receive system for transmitting energy impulses and receiving the reflected echoes thereof, the combination of variable-width pulse developing means responsive to the transmitted impulses and their respective echoes for producing pulses having widths correlative to the transit time of the transmitted impulses and their received respective echoes, and a pair of one shot multivibrators alternately supplying simulated echoes to said pulse developing means as long as no echoes of transmitted impulses are received.

6. Echo ranging apparatus for indicating the distance of a reflecting surface, comprising a signal generating circuit having two terminals and including a multivibrator, said generating circuit being effective to present transmitting impulses at one of said terminals simultaneously with non-transmitting impulses at the other of said terminals, a transducer connected to said one terminal to transmit said transmitting impulses and to receive the reflected echoes thereof, a receiver connected to said transducer for receiving the reflected echoes, a measuring circuit connected to said other terminal and to said receiver and effective to measure the time interval between the non-transmitting impulses of said multivibrator and the reception of the pulse echoes, and simulated echo producing means for said measuring circuit operatively initiable by said measuring circuit in response to a reflected echo for applying simulated echoes to said measuring circuit in the absence of subsequent reflected echoes of transmitted impulses.

7. Echo-ranging apparatus for indicating the instantaneous distance variations of a reflecting surface, comprising a signal generator having two terminals and including a multivibrator in conjunction with a gated oscillator and a differentiator circuit for presenting transmitting impulses at one of said terminals simultaneously with nontransmitting impulses at the other of said terminals, said one terminal being connected to the gated oscillator and said other terminal being connected to said differentiator circuit, a transducer coupled to said one terminal for emitting the transmitting impulses and for receiving the reflected echoes thereof, a translating circuit connected to said transducer for passing the echoes received thereby, a flip-flop circuit including a pair of tubes so connected that initiation of conduction in one tube blocks conduction in the other and vice versa, each of said tubes having a control grid by which conduction can be initiated, circuit means connecting said other terminal to the grid of the first of said tubes whereby conduction in said first tube is initiated in response to the nontransmitting impulses of said signal generator, circuit means connecting said translating circuit to the grid of the second of said tubes whereby conduction in said second tube is initiated in response to reception of the echo impulses and conduction in said first tube is thereby blocked whereby said flip-flop circuit develops square-wave output signals correlative to the transit time of the transmitted impulses and their respective reflected echoes, measuring means connected to utilize said developed square-wave signals for indicating the instantaneous distance variations of the reflecting surface, and echo-loss compensating means having an input circuit and output circuit and being operatively effective to generate simulated echoes, said input circuit being connected to said first tube so that nonconduction of said first tube due to reception of a reflected echo initiates operation of said compensating means, said output circuit being connected to the grid of said second tube whereby simulated echoes are applied to the grid of said second tube in the absence within a predetermined interval of time of subsequent reflected echoes of transmitted impulses.

8. The echo-ranging apparatus of claim 7, wherein said flip-flop circuit is an Eccles-Jordan circuit.

9. The echo-ranging apparatus of claim 7, wherein said echo-loss compensating means incudes a pair of one-shot multivibrators alternately presenting a simulated echo to said output circuit.

10. In a mobile pulse-echo distance determining system for continuously measuring the instantaneous distance variations of a reference reflecting surface by transmitting impulses and receiving the echoes thereof reflected from said reflecting surface, the combination comprising a flip-flop circuit including a pair of triode tubes so connected that initiation of conduction in one tube blocks conduction in the other and vice versa, circuit means connected to the grid of the first of said tubes for initiating conduction of said first tube coincidently with transmitted impulses, circuit means connected to the grid of the second of said tubes for initiating conduction of said second tube in response to reception of the echo impulses and conduction in said first tube is thereby blocked whereby said flip-flop circuit develops square-wave output signals correlative to the transit time of the transmitted impulses and their respective echoes, utilization means responsive to said square-wave signals for indicating the instantaneous distance variations of the reference surface, a first one-shot multivibrator circuit including a pair of electron discharge devices so connected that initiation of conduction in one of said devices blocks conduction in the other and vice versa, the first of said devices having a control grid by which conduction thereof can be initiated, a time constant network connected to said first device to render said first device nonconducting after a predetermined interval of time has elapsed after conduction thereof has been initiated, circuit means connecting the anode of said first tube to said control grid to initiate conduction of said first device by the change in the conductive state of said flip-flop circuit due to reception of an echo, said first multivibrator having an output circuit connected to the grid of said second tube for applying a conductive initiating potential to said second tube upon termination of said predetermined interval of time, said potential simulating an echo in the absence of the reception of an echo within said predetermined interval of time, a second one-shot multivibrator circuit including a pair of electron conductive devices so connected that initiation of conduction in one of said conductive devices blocks conduction in the other of said conductive devices and vice versa, the first of said conductive devices having a control grid by which conduction thereof can be initiated, a time constant circuit connected to said first conductive device to render said first conductive device nonconducting after a predetermined interval of time has elapsed after the conduction thereof has been initiated, and circuit means connecting the output circuit of said first multivibrator to the control grid of said first conductive device whereby said first multivibrator applies a conductive initiating potential to said first conductive device simultaneously with the initiating potential applied to said second tube, said second multivibrator having an output circuit connected to the grid of said second tube for applying a conductive initiating potential to said second tube upon termination of the predetermined interval of time determined by said time constant circuit, the initiating potential applied by said second multivibrator simulating an echo in the absence of the reception of an echo within the predetermined interval of time determined by said time constant circuit and thereby being effective to initiate conduction of the first device of said first multivibrator whereby said first and second multivibrator alternately apply simulated echo potentials to said second tube as long as no true echoes are received.

11. The apparatus of claim 10 wherein the circuit means connecting the anode of said first tube to the control grid of said first device includes a unilateral conductive poled to present a negligible impedance path to potentials of negative polarity and a differentiator circuit; wherein the output circuit of said first multivibrator comprises a differentiator circuit including a pair of unilateral conductive devices and a resistor connected in closed series circuit relation; wherein the circuit means connecting the output circuit of said first multivibrator to the control grid of said first electron conductive device includes a unilateral conductive device poled to present a negligible impedance path to potentials of negative polarity and a differentiator circuit; and wherein the output circuit of said second multivibrator comprises a differentiator circuit including a pair of unilateral conductive devices and a resistor connected in closed series circuit relation.

12. A pulse-echo range measuring system borne by a moving vehicle for continuously measuring the instantaneous distance variations thereof from a reference reflecting surface comprising, in combination, signal generating means for producing a continuous series of ultrasonic impulses, transducer means for radiating said impulses and receiving the echoes thereof reflected from said reference surface, a receiver circuit coupled to said transducer for translating the received echoes, diode clamp means in said receiver circuit responsive to signals from said generating means coincident with the radiating impulses for disabling said receiver circuit during radiation of the ultrasonic impulses, lock-out circuit means in the output of said receiver circuit for passing the shortest-path echo of the radiated impulses and excluding subsequent extraneous echoes caused by inhomogeneity of said reflecting surface, pulse forming means connected to said signal generating means and to said lock-out device and initiable at the instants of impulse radiation and responsive to the shortest-path echo passed by the lock-out circuit means for developing pulses having widths correlative to the elapsed time between the radiation of ultrasonic impulses and the reception of their respective shortest-path echoes, recording means for integrating said developed pulses to produce and record indications representative of the instantaneous distance variations, and simulated echo generating means operatively associated with said pulse forming means for applying simulated echoes to said pulse forming means in the absence of received echoes within an interval of time after radiation of their respective ultrasonic impulses.

13. The apparatus of claim 12, wherein said pulse forming means is an Eccles-Jordan circuit having one input terminal connected to the signal generating means and the other input terminal connected to said lock-out circuit means, and wherein said simulated echo generating means includes a pair of one-shot multivibrators each having an input circuit and an output circuit, the input circuit of the first of said multivibrators being connected to a point in said Eccles-Jordan circuit which is responsive to changes in the conductive state of said Eccles-Jordan circuit to thereby initiate the function of said first multivibrator, the output circuit of said first multivibrator being connected to the input circuit of said second multivibrator to initiate the function thereof, and the output circuits of said first and second multivibrators having a common terminal connected to said other input terminal of said Eccles-Jordan circuit whereby said first and second multivibrators alternately apply simulated echoes to said other input terminal in the absence of received echoes within an interval of time after radiation of their respective ultrasonic impulses.

14. The apparatus of claim 13, wherein said lock-out circuit means comprises a gas-filled thyratron tube having an anode, cathode, control grid and shield grid, the output of said receiver circuit being connected to said control grid for applying echo signals thereto, the leading edge of the shortest-path echo signal firing said thyratron tube to develope a triggering signal, a time-constant network consisting of a condenser and resistor serially connected between said anode and cathode effective upon the firing of said thyratron tube to disable and render said thyratron tube ineffective to pass echo signals for a predetermined period of time as determined by the time constant of said time-constant network, circuit means connecting said signal generating means to said shield grid whereby said thyratron tube is disabled during instants of impulse radiation, and circuit means connecting said cathode to said other input terminal of said Eccles-Jordan circuit to thereby apply said triggering signal thereto.

15. An echo-ranging acoustic depth recorder system borne by a moving underwater vehicle for continuously measuring the running depth of the vehicle by utilizing the air-water interface as a reference and as the reference reflecting surface, the running depth being determined by the transit time of the shortest-path echoes of ultrasonic impulses reflected from the air-water interface comprising, in combination, transmitting circuit means for producing and emitting ultrasonic impulses, receiving circuit means for receiving the echoes of said impulses after reflection from the air-water interface, lock-out circuit means coupled to said receiving circuit means for passing the shortest-path echoes of the transmitted impulses and excluding subsequent extraneous echoes caused by the inhomogeneity of the air-water interface, a variable-width square-wave generator having first and second input terminals and a varying potential terminal, said transmitting circuit being connected to said first input terminal and said lock-out circuit means is connected to said second input terminal whereby said square-wave generator is initiable at the instants of impulse transmission and responsive to the respective shortest-path echoes passed by said lock-out circuit means for developing square waves having widths corresponding to the transit time of the transmitted impulses and the reception of their respective shortest-path echoes reflected from the air-water interface, and a pair of one-shot multivibrators connected in cascade for generating simulated echoes, the first of said multivibrators having its input connected to said varying potential terminal whereby operation of said first multivibrator is initiated in response to the varying potential at said varying potential terminal, said pair of multivibrators having a common output circuit connected to said second input terminal whereby said multivibrators alternately apply simulated echoes in predetermined time delayed relation to said second input terminal as long as no true echoes are received.

16. In a system of the character disclosed for measuring the running depth of a subaqueous vehicle from the air-water interface by determining the transit time of ultrasonic impulses transmitted from said system and the reception of their respective shortest-path echoes reflected from the air-water interface, the combination of a variable-width square-wave generator initiable at the instants of impulse transmission and responsive to their respective shortest-path echoes reflected from the air-water interface for generating square waves having widths representatively corresponding to the transit time of the transmission of the ultrasonic impulses and reception of their respective shortest path echoes, means utilizing said generated square waves for continuously recording each generated square wave as a frame for indicating the instantaneous distance variations of the vehicle from the air-water interface, and echo-loss compensating means operatively associated with said generator for developing simulated echoes for lost reflected echoes, said echo-loss means applying a simulated echo to said generator at a predetermined interval of time after the lost echo should have been received had the distance of the vehicle from the air-water interface remained the same as recorded in the last recorded frame, the predetermined interval of time increasing a predetermined constant increment of time for each succeeding simulated echo in a series of successively generated simulated echoes applied to said generator thereby resulting in the addition of a given known increment of range to each succeeding recorded frame, the predetermined constant increment of time corresponding to a given increment of distance as determined by the known rate of vertical movement of the vehicle due to the buoyancy character thereof in water.

17. An echo-ranging depth recorder system for a mobile underwater moving body utilizing the air-water boundary as a distance reference and as a reference reflecting surface for the continuous determination of the instantaneous distance variations of the moving body from the air-water boundary comprising, in combination, signal generating means for generating transmitting ultrasonic impulses and for generating a peaked pulse and a negative nontransmitting impulse in time coincidence with the generation of each ultrasonic impulse, a transducer for transmitting the ultrasonic impulses and for receiving the echoes thereof reflected from the air-water boundary, a diode limiter circuit connected to said transducer for limiting the amplitude of the ultrasonic impulses received by said limiter and for passing the echoes received by said transducer, a cathode follower connected to said diode limiter effective to pass the received echoes and the limited ultrasonic impulses, a diode clamping circuit connected to receive the signals passed by said cathode follower and connected to said generating means so as to have said generated negative impulse applied thereto whereby said clamping circuit is rendered ineffective at the instants of ultrasonic impulse transmission and for a predetermined period of time thereafter to thereby block passage of said limited ultrasonic impulses and to subsequently become effective to pass the received echoes, a detector circuit coupled to said diode clamping circuit for rectifying the echoes passed by said clamping circuit, an amplifying and inverting circuit connected to said detector circuit for amplifying and inverting the rectified echoes, a gas-filled thyratron tube having at least an anode, cathode and control electrode, said control electrode being connected to said amplifying and inverting circuit whereby the inverted rectified echoes are applied thereto, the leading edge of the shortest-path rectified echoes of the transmitted ultrasonic impulses firing said thyratron tube to develop a triggering spike for each shortest-path rectified echo, a time constant network connected between said anode and cathode, said time constant network being effective upon firing of said thyratron tube to disable said thyratron tube for a predetermined interval of time as determined by the parameters of said time constant network to thereby render said thyratron tube ineffectively responsive to the rectified inverted echoes for said predetermined interval of time, an Eccles-Jordan circuit having two input terminals, an output terminal, and a varying potential terminal, said Eccles-Jordan circuit having a first state of equilibrium and a second state of equilibrium, the first state of equilibrium being the inherent state of equilibrium of said Eccles-Jordan circuit, the potential presented at said varying potential terminal by the Eccles-Jordan circuit changing with each change in the state of equilibrium of said Eccles-Jordan circuit, said generating means being connected to apply said peaked pulses to one of said input terminals to change the state of equilibrium of said Eccles-Jordan circuit from its inherent state of equilibrium to its second state of equilibrium, said thyratron being connected to apply said triggering spike to the other of said input terminals to return said Eccles-Jordan circuit to its inherent state of equilibrium, said Eccles-Jordan circuit developing square waves having widths representatively corresponding to the time interval between application thereto of the peaked pulses and the triggering spikes, said developed square waves appearing at said output terminal, utilization means connected to said output terminal for integrating said developed pulses to produce and record indications representative of the distance variations of the moving body from the air-water boundary, and a pair of one-shot multivibrators connected in cascade and being so connected as to alternately generate simulated echoes for lost shortest-path echoes, the first of said multivibrators having its input connected to said varying potential terminal, means in the input of said first multivibrator for initiating the operation of said first multivibrator in response to the varying potential presented at said varying potential terminal when said Eccles-Jordan circuit is being returned to its inherent state of equilibrium by a trigger spike from the thyratron tube, said pair of multivibrators having a common output circuit connected to said other input terminal whereby said multivibrators alternately apply simulated echoes in predetermined time delayed relation to said other input terminal as long as no true echoes are received.

No references cited.